United States Patent
Holdaway

[15] 3,699,350
[45] Oct. 17, 1972

[54] RADIANT ENERGY MARK SENSOR

[72] Inventor: Daniel O. Holdaway, Longmont, Colo.

[73] Assignee: International Business Machines Corporation, Armonk, N.Y.

[22] Filed: Dec. 28, 1970

[21] Appl. No.: 101,704

[52] U.S. Cl. ............... 250/225, 250/219 D, 350/147, 350/152, 350/156
[51] Int. Cl. ............................................... G02f 1/18
[58] Field of Search........ 350/111, DIG. 1, 331, 152, 350/156, 147, 148, 117, 114-115, 118; 250/225, 219 D; 340/174 YC, 174.1 M; 235/61.11 E

[56] References Cited

UNITED STATES PATENTS 3,502,888   3/1970   Stites ..................... 350/152 X
3,566,383   2/1971   Smith .................. 340/174.1 M Primary Examiner—Ronald L. Wibert
Assistant Examiner—R. J. Webster
Attorney—Hanifin & Jancin and Homer L. Knearl

[57] ABSTRACT

The radiant energy mark sensor herein makes use of Brewster's Law and adds a polarizing screen in the light path to improve the radiant energy contrast between marks and a background. The incident beam of light strikes the background at or near Brewster's angle. A polarizing screen is placed in the path of the reflected light. Light reflected from the background will be polarized, and the polarizing screen can null out that light. Light reflected from marks will not be polarized, and some of the light will be passed by the polarizing screen. In an alternative configuration, the polarizing screen is placed in the incident light path to control the amount of light reflected from the background and from the mark.

9 Claims, 4 Drawing Figures

PATENTED OCT 17 1972 3,699,350

INVENTOR
DANIEL O. HOLDAWAY
BY Homer L. Kneavl
ATTORNEY

RADIANT ENERGY MARK SENSOR

BACKGROUND OF THE INVENTION

This invention relates to radiant energy mark sensing. More particularly, the invention relates to mark sensing where the background surface carrying the marks is a transparent material. Transparent material is defined herein as a material having an index of refraction for the wavelength of radiant energy being used.

In the past, marks coated on transparent backgrounds have been sensed by directing white light onto the surface and monitoring the reflected light with a photodetector. The sensing of marks is dependent upon the differences in reflectivity of the mark and the transparent background. The optimum contrast (change in light intensity detected at photodetector) obtainable in this conventional sensor has been in the order of 10 to 1.

In a tightly controlled environment, a contrast ratio of 10 to 1 is quite acceptable. However, in an environment where components are mass produced, a 10 to 1 contrast ratio may not be sufficient. For example, to detect the presence of a mark, the output of the photodetector would be monitored with a threshold detecting circuit. When the contrast ratio is 10 to 1, the threshold would be set such that approximately a 6 or 7 to 1 ratio in reflected light intensity difference would exceed the threshold. When the components of various systems utilizing this type of sensor are not tightly matched, then it is possible for one light source to be many times brighter than another light source. If the same threshold in the detecting circuit were used, reflected light produced by a bright light source might always be greater than the threshold intensity, irrespective of whether a mark or background was being sensed. Therefore, the manufacturer is forced to use expensive components and also an extensive matching and calibrating operation to insure that thresholds are properly set to detect the presence of marks on the surface being scanned.

It is an object of this invention to increase the contrast ratio between background and marks by an order of magnitude.

It is another object of this invention to sense marks coated on transparent backgrounds.

SUMMARY OF THE INVENTION

In accordance with this invention, the above objects are accomplished by directing the beam of incident light onto the background at or near Brewster's angle. In addition, a polarizing screen is placed in the light path. The polarizing screen is adjusted so as to inhibit light reflected from the background or to inhibit light from reflecting from the background.

As another feature of the invention, light refracted into a transparent background is absorbed or scattered by a non-reflective coating on the back of the transparent material.

As another feature of the invention, the polarizing screen, placed in the reflected light path, is also a wavelength filter. The filtering operation is useful in preventing the passage of ambient light to the photopickup device in the reflected light path. In other words, the filter is selected to pass only light of the wave length of the incident light. Other light which may also be illuminating the surface being scanned is filtered out.

The great advantage of this invention is that the contrast ratio between the reflective background and the mark has been increased to 40 to 1. As a result of this very high contrast ratio, the components used to sense the marks do not need to be closely matched. The components can be low in cost, and no previous testing or calibration of components is necessary. With a 40 to 1 contrast ratio, the threshold used by the photodetecting circuit can be chosen so that all components even without calibration will produce intensity variations that will enable the photo-detecting circuit to distinguish between marks and background.

The foregoing and other objects, features, and advantages of the invention will be apparent from the following more particular description of preferred embodiments of the invention as illustrated in the accompanying drawings.

DESCRIPTION

Figure 1A:
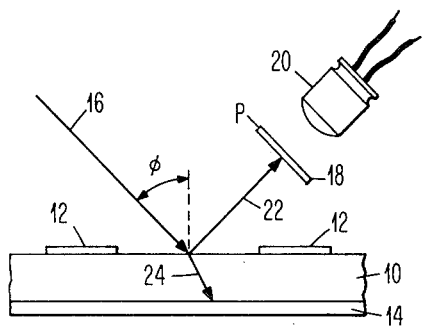
FIGS. 1A and 1B show one preferred embodiment of the invention indicating the light paths when the beam of light strikes the transparent background and when the beam of light strikes a mark attached to the background.
Figure 1B:
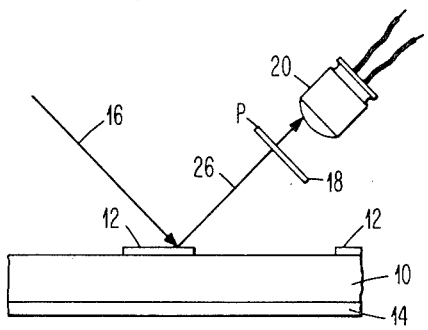

FIGS. 1A and 1B show the preferred embodiment of the invention wherein the polarizing screen is placed in the reflective light path. The object being scanned by the light beam is made up of transparent substrate, or background material, 10. This material could be a polyester, glass, or any other material having an index of refraction for the wave length of radiant energy being used. Attached to this substrate 10 are the reflective marks 12. The marks are formed by coating a highly reflective metal on the surface of the substrate 10. Some examples might be aluminum or silver. The back of the substrate 10 is coated with a light absorbent material 14. This material could be iron oxide or simply a flat black paint.

The incident light 16 is directed onto the substrate 10 in FIG. 1A. A portion of the light is refracted into substrate 10 and absorbed by the light absorbing layer 14. The remaining light is reflected from the substrate 10 to the polarizing screen 18. A photodiode or phototransistor 20 is mounted behind the polarizing screen 18 to detect the presence of any reflected light 22 passed by the screen 18.

As shown in FIG. 1A, the incident light 16 strikes the substrate 10, and the reflected light is blocked by the polarizing screen 18 so that it does not reach the photopickup 20. This is accomplished by having the incident beam of light 16 strike the substrate 10 at or near Brewster's angle and placing the polarizing screen 18 to null out the polarized reflected light. As is well known, Brewster's angle is given by the following expression: $n_2/n_1 = \tan \theta$ where $n_2$ is the index of refraction of the substrate 10, $n_1$ is the index of refraction of the incident medium (usually air where $n_1 = 1$), and $\theta$ is the angle of incidence of the light beam 16. While the above expression gives the angle of incidence for optimum polarization of reflected light, the exact angle is not critical. Successful operation can be achieved if the angle of incidence is within a range specified by Brewster's angle $-20°$ and Brewster's angle $+5°$. The reflected light 22 is plane polarized perpendicular to the plane of incidence. The polarizing screen 18 is set to pass light only in the plane of incidence, and, therefore, little or reflected light is passed by the polarizing screen 18 in FIG. 1A.

The refracted light 24 in FIG. 1A passes through the substrate 10 and is absorbed in the light absorbent material 14 or scattered at the interface between substrate 10 and material 14. If the light were not scattered at this interface, it would reflect back out the top of the substrate 10, through the polarizing screen 18 and to the photodetector 20. The refracted light 24, of course, would have a component in the plane of polarization of polarizer 18 and, thus, would pass through polarizing screen. Therefore, the light absorbing or scattering material 14 is provided to insure that negligible reflected light from inside the substrate 10 will reach the photodetector 20.

In FIG. 1B, the incident light 16 strikes a reflective mark 12. Brewster's Law is no longer satisfied. The reflected light 26 from the mark 12 is not polarized. Accordingly, the polarizing screen 18 will pass some component of the reflected light 26. Light passed by the polarizing screen 18 is picked up by the photodetector 20. The output of the photo-detector is monitored by electronic circuitry not shown, and, when the electrical signal exceeds a preset threshold, the mark has been detected.

Figure 2:
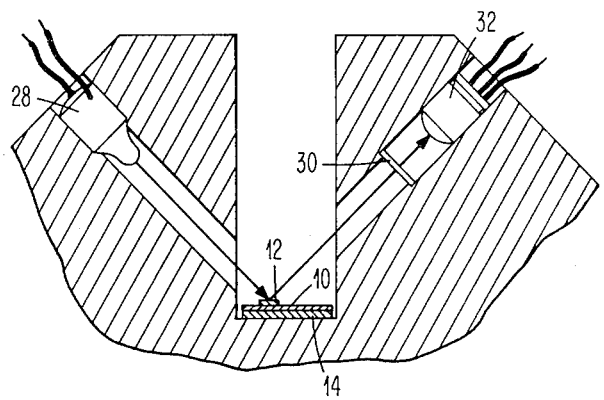
FIG. 2 shows the invention implemented as a beginning-of-tape and end-of-tape mark sensor.

In FIG. 2, the invention is applied to the detection of aluminum strips attached by adhesive to the back of magnetic tape. The substrate 10 is a flexible web, such as polyester, the reflective mark 12 is a strip of aluminum and the light absorbing layer 14 is usually some composition of magnetic particles in a binder. The light source 28 may be a small incandescent bulb. The source 28 is placed so that light from the bulb will strike the substrate 10 at or near Brewster's angle. It has been found that the optimum angle of incidence for a polyester is 59°; although, any angle between 40° and 65° will polarize the light sufficiently for use in this invention. Light reflected from the substrate 10 or the mark 12 must pass through the polarizing screen 30 in FIG. 2 before it can reach the phototransistor 32.

The polarizing screen 30 is also made up of a material that passes only infrared radiation. Thus, the screen 30 also acts as an optical filter tuned to light from the source 28. This prevents any ambient illumination of substrate 10 or mark 12 from reaching the phototransistor 32. Of course, the source 28 must have a strong component in the infrared portion of the spectrum.

The operation of the mark sensor for magnetic tape in FIG. 2 is identical to the operation previously described with reference to FIGS. 1A and 1B.

Figure 3:
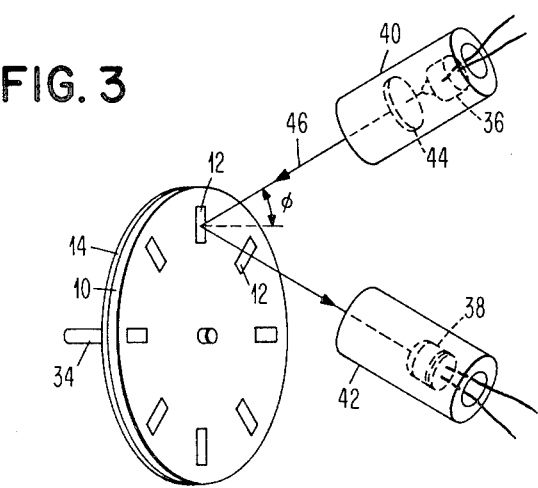
FIG. 3 shows the invention implemented as a tachometer mark sensor and where the polarizing screen is placed in the incident light path.

Yet another application of the invention is shown in FIG. 3 where the mark sensor is used to detect marks on an optical tachometer. The transparent substrate 10 takes the shape of a wheel mounted on a shaft 34. The back of the substrate 10 is again coated with a light absorbent or scattering material 14, and the front of the substrate 10 has reflective marks 12 attached. A light source 36 and a photocell 38 are mounted in their respective holders 40 and 42. In addition, a polarizing screen 44 is placed in front of the light source 36 in the holder 40.

In operation, light from the source 36 is polarized by polarizer 44 and is then incident at Brewster's angle on the substrate 10. The plane of polarization of the incident light 46 is such that at Brewster's angle all of the light will be refracted into the transparent material 10 and absorbed or scattered by the light absorbing material 14. In other words, the angle of incidence $\theta$ of the light 46 is again given by the expression:

$$n_2/n_1 = \tan \theta$$

where $n_2$ is the refractive index of the substrate 10 and $n_1$ is the index of refraction of the incident medium. Also, the incident light 46 must be linearly polarized perpendicular to the plane of incidence so that substantially all the incident light is refracted into the substrate 10.

In this mode of operation, incident light will only be reflected to the photocell 38 when the light strikes a reflective mark 12. When the light strikes the substrate 10, it is refracted and absorbed or scattered.

It will be appreciated by one skilled in the art that there are many applications other than the two described in FIGS. 2 and 3 for this invention. Also, a great variety of light sources, polarizing screens, and photopickup devices could be utilized. In addition, any transparent substrate along with reflective marks could be used. The addition of the light absorbent or scattering material 14 is desirable, but is not critical to operation. The function of preventing light from being internally reflected in the substrate 10 and back to the photopickup could be accomplished by several expedients, such as making the back surface of the substrate 10 irregular. Thus, while the invention has been particularly shown and described with reference to preferred embodiments thereof, it will be understood that various changes in form and details may be made therein without departing from the spirit and scope of the invention.

What is claimed is:

1. Radiant energy mark sensing apparatus for detecting the presence of reflective marks on a substrate transparent to the radiant energy comprising:

means for directing radiant energy onto the substrate and the reflective marks at an angle of incidence such that radiant energy reflected from the substrate is linearly polarized perpendicular to the plane of incidence and radiant energy refracted into the substrate is linearly polarized in the plane of incidence, and radiant energy reflected from said marks is substantially unchanged in polarization and contains at least radiant energy components oriented in the plane of incidence;

means for detecting radiant energy reflected from the substrate and from the reflective marks;

means for inhibiting reflected radiant energy linearly polarized perpendicular to the plane of incidence from passing from the substrate to said detecting means while passing to said detecting means radiant energy components oriented in the plane of incidence reflected from the reflective marks so that the contrast ratio between detected radiant energy from marks and detected radiant energy from the substrate is enhanced.

2. The apparatus of claim 1 wherein said inhibiting means comprises:
means for linearly polarizing in the plane of incidence the incident radiant energy supplied by said directing means so that the linearly polarized incident radiant energy striking the substrate at said angle will be substantially refracted into the substrate.

3. The apparatus of claim 1 wherein said inhibiting means comprises:
means for analyzing the polarization of reflected radiant energy so that non-linearly polarized reflected radiant energy from reflective marks is passed to said detecting means while linearly polarized radiant energy reflected from the substrate is blocked from reaching said detecting means.

4. The apparatus of claim 1 and in addition:
means for filtering the reflected radiant energy so that only radiant energy with a wave-length within the spectrum of the radiant energy supplied by said directing means may be passed to said detecting means.

5. The apparatus of claim 1 and in addition:
means for absorbing and scattering radiant energy refracted into the substrate so that radiant energy refracted into the substrate cannot reflect back to said detecting means.

6. A method for distinguishing areas reflective to radiant energy from transparent substrates when the areas are mounted on substrates transparent to the same radiant energy, comprising the steps of:
illuminating the substrate and the reflective areas with the radiant energy at an angle of incidence such that the radiant energy reflected by the substrate is linearly polarized while radiant energy reflected by the reflective area is unpolarized;
analyzing the polarization of the reflected radiant energy whereby linearly polarized radiant energy reflected by the substrate is distinguished from unpolarized radiant energy reflected by the reflective marks.

7. The method of claim 6 and in addition the step of:
absorbing or scattering radiant energy refracted into the substrate by the substrate.

8. The method of claim 6 wherein said analyzing step comprises the steps of:
filtering the radiant energy reflected by the substrate and by the reflective areas with a polarizing filter oriented to intercept the linearly polarized radiant energy reflected by the substrate;
detecting the filtered reflected radiant energy whereby the presence of reflective areas is indicated by a substantial increase in the radiant energy detected.

9. A method for distinguishing areas reflective to radiant energy from a support substrate transparent to the same radiant energy comprising the steps of:
illuminating the substrate and the reflective areas with linearly polarized radiant energy where the angle of incidence of the radiant energy on the substrate and reflective areas is such that linearly polarized radiant energy incident upon the substrate is refracted into the substrate while the radiant energy incident upon the reflective area is reflected;
detecting the reflected radiant energy whereby the presence of the reflective areas is indicated by a substantial increase in the radiant energy detected.

* * * * *